Dec. 27, 1949   W. B. HILLS   2,492,749
HIGH-SPEED SEQUENCE CONTROL
Filed Sept. 8, 1948
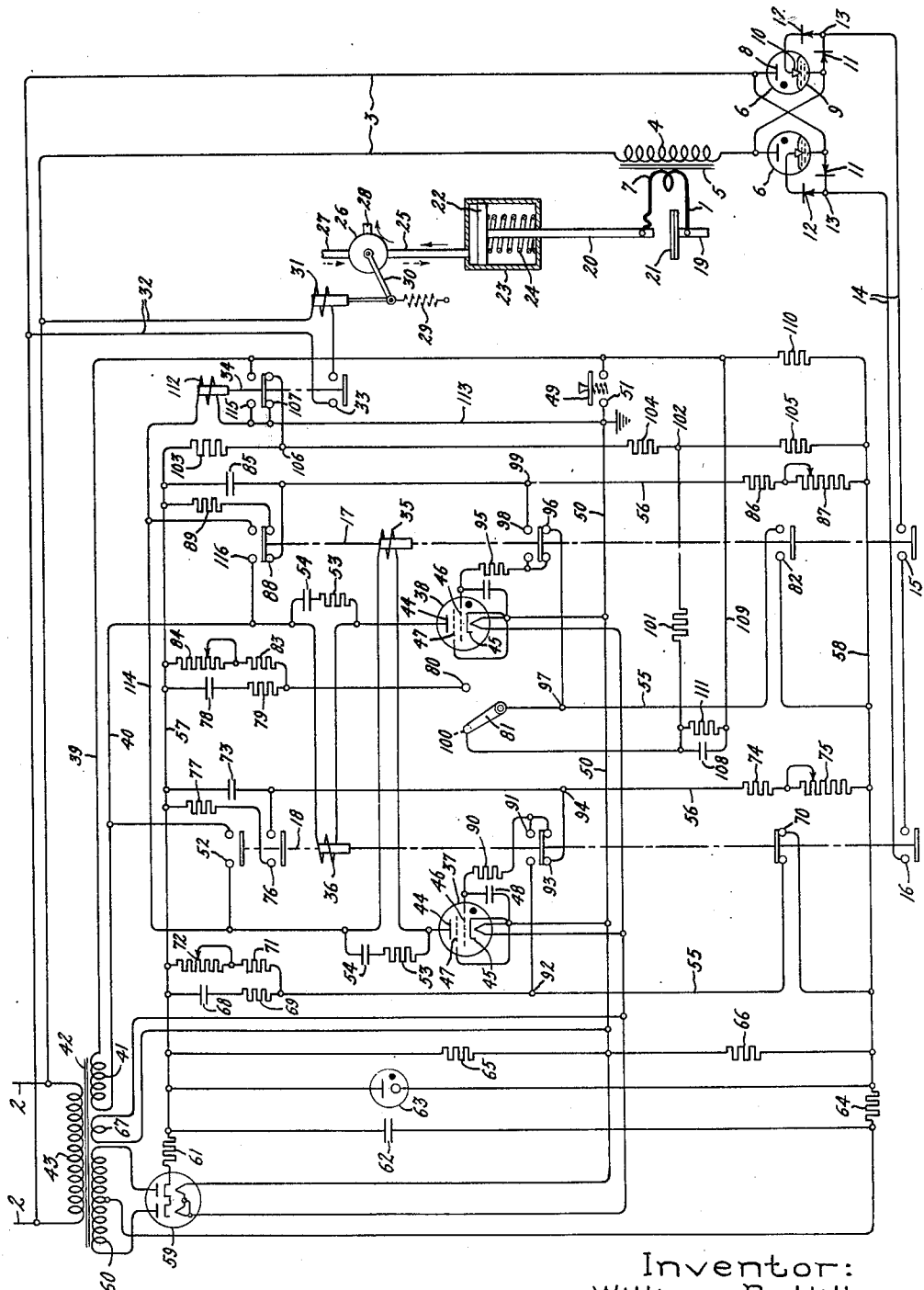
Inventor:
William B. Hills,
by Claude A. Mott
His Attorney.

Patented Dec. 27, 1949

2,492,749

UNITED STATES PATENT OFFICE 2,492,749

HIGH-SPEED SEQUENCE CONTROL

William B. Hills, Colonie, N. Y., assignor to General Electric Company, a corporation of New York Application September 8, 1948, Serial No. 48,304

10 Claims. (Cl. 171—97)

1

My invention relates to timing apparatus and more particularly to apparatus embodying electric circuits in which electric discharge devices are employed for obtaining desired timing operations.

In industrial control, it is frequently desirable to provide apparatus for controlling the sequence and timing of certain operations. For example, in resistance welding, certain operations must follow one another after predetermined adjustable time periods and a sequence control for such purpose will involve at least four timing intervals which may be identified as "squeeze," "weld," "hold," and "off." The squeeze time allows for the operation of means employed for closing the welding electrodes on the work with the desired pressure before the welding current is applied thereto through the electrodes to make a weld. The weld time determines the period during which welding current flows to make the weld. The hold time determines the time that the electrodes remain on the work with full pressure after welding current ceases flowing and before the means for pressing the electrodes on the work is operated to release the work. The off time determines the time interval before the means for pressing the electrodes into engagement with the work is again operated when performing repeat operations.

Where the timing units for such a sequence of operations each embody an electric timing valve which controls the energization of an electromagnetic relay to secure the desired timing interval, the time required for pick-up and drop-out of the relay may seriously limit the overall speed of operation of the system. If the operation of each of such timing units is made dependent in its turn upon the prior operation of another of the timing units, the consequent cascading of the units causes the pick-up and drop-out times of each of the relays to become cumulative and consequently limit the maximum speed of operation of the system. For certain resistance welding operations, it is desirable to have the timing system operate at speeds up to 360, 3 cycle welds per minute and 400, 2 cycle welds per minute. This is particularly true in the automobile industry where portable gun welders are used.

In the application of Maurice E. Bivens, Serial No. 48,256, for Timing apparatus filed concurrently herewith and assigned to the assignee of this invention there is described and claimed a timing system in which the overlapping pick-up and drop-out conditions of two electronic relays are employed for securing four timing operations with only one pick-up and drop-out operation of each of the relays. This consequently eliminates the time required for two pick-up and two drop-out operations such as would be required if four electronic relays were used and operated each in dependence on the other to secure the same four time intervals.

Once this Bivens system is set in operation, however, it continues to function to produce an unbroken repeated sequence of timing operations which continues so long as the system is energized. It is, of course, desirable to have this system operate in a manner to secure just one sequence of timing operations.

It is an object of my invention to provide for non-repeat operation for such a system by providing a non-repeat excitation circuit for one of the pair of electric valves of such a system.

My invention will be better understood from a description of the embodiment thereof diagrammatically illustrated in the accompanying drawing.

As illustrated in this drawing, the load or welding circuit 1 is energized from a source of alternating current 2 through a supply circuit 3 including the primary winding 4 of a welding transformer 5 and a pair of electric valves 6 which are reversely connected in parallel with one another to supply alternating current from the supply circuit through the transformer 5 to its secondary 7 and the load circuit 1 connected thereto. The electric valves 6 may be of any of the types well known in the art but, as illustrated, each comprises an anode 8, a mercury pool cathode 9, and an immersion igniter type control element 10. The igniter elements 10 may be formed of a high resistance material and are arranged in the electric valves so that their tips are immersed in the mercury cathode pools of these valves. The elements of each of these electric valves are enclosed in envelopes which preferably contain, as indicated by the dot, an ionizable medium such as a gas or vapor.

The control element 10 of each of the electric valves is connected to its cathode through a by-pass rectifier 11 and a blocking rectifier 12 which are connected in series with one another and are poled to pass current from the cathode to the control element. The common connections 13 between each of these pairs of rectifiers 11 and 12 are connected together by a control circuit 14 including normally open series connected pairs of contacts 15 and 16 of relays 17 and 18. When both of these normally open pairs of contacts 15 and 16 are closed, the electric valves 6 become conducting to pass alternating current when the supply circuit 3 is energized. When either or both of these normally open pairs of contacts remain open, the electric valves become non-conducting, even though the supply circuit 3 is energized. Thus, for example, when a positive anode potential is applied to the anode 8 of the left-hand valve 6, current will flow through rectifier 11 for the right-hand valve, through the control circuit 14, and through rectifier 12 for the left-hand valve to its control element and through its cathode to the other supply conductor. In like manner, the right-hand electric valve 6 will become conducting when a positive anode potential is applied to its anode 8, and the control circuit 14 is completed. The rectifiers 11 and 12 are preferably of the contact type, as exemplified by the copper oxide rectifier.

The load circuit 1 is connected to cooperating electrodes 19 and 20 between which the work 21 is inserted for welding. As illustrated, the lower electrode 19 is stationary and constitutes a support for the work 21. The upper electrode 20 is movable into and out of pressure exerting engagement with the work by means of a piston 22 enclosed within a cylinder 23 and biased to its upper position by a spring 24 located within the cylinder and between the piston 22 and the lower end wall of the cylinder. The piston 22 is moved lengthwise of the cylinder 23 against the bias of spring 24 by supplying motive fluid between the piston 22 and the upper end wall of the cylinder 23 through a combined supply and exhaust pipe 25. The supply of fluid, which in most cases will be compressed air, is controlled by a three-way valve 26 having a pressure inlet connection 27 and an exhaust connection 28. The valve 26 is biased to the exhaust position by a spring 29 which is connected to its operating arm 30. This operating arm is also connected with the plunger of a solenoid having an operating winding 31 connected through conductors 32 and the normally open contacts 33 of a relay 34 across the supply conductors 3.

The operating winding 112 of relay 34 is connected across the alternating current supply conductors 39 and 40 through contacts 51 of push button switch 49, conductors 113 and 114 and either the normally open contacts 52 of relay 18 or the normally open contacts 116 of relay 17, or both of these contacts. A holding circuit for relay 34 is completed through its normally open contacts 115 which are connected in parallel with the normally open contacts 51 of push button switch 49.

The operating windings 35 and 36 of relays 17 and 18 are respectively connected through electric valves 37 and 38 across the alternating current supply conductors 39 and 40. These conductors 39 and 40 are connected to the secondary 41 of a transformer 42 having its primary 43 connected across the source of alternating current 2.

Electric valves 37 and 38 are each provided with an anode 44, a cathode 45, a control element 46, and a shield grid 47 which is directly connected electrically with its cathode. The elements of each of these electric valves are enclosed in envelopes which preferably contain, as indicated by the dot, an ionizable medium such as a gas or vapor. Capacitors 48 are connected across the control element and cathode of each of the electric valves to render each of these valves resistant to faulty operation resulting from transient anode voltages applied thereto.

Alternating current supply conductor 39 is connected through a normally non-conducting switching means 49 to a conductor 50 which is connected to the cathodes 45 of each of the electric valves 37 and 38. The switching means 49, may be, as illustrated, a push button switch having a pair of normally open contacts 51.

The anode 44 of electric valve 37 is connected in series circuit with the operating windings 35 and a pair of normally open contacts 52 of relay 18 to conductor 40 and the anode 44 of electric valve 38 is connected in series circuit with the operating windings 36 of relay 18 to conductor 40. In each case the operating windings of relays 17 and 18 have connected in parallel therewith a smoothing circuit comprising a resistor 53 connected in series with a capacitor 54. These smoothing circuits render more uniform the energization of the windings of these relays which by reason of the rectifier characteristics of electric valves 37 and 38 are supplied with pulsating current from the alternating current supply conductors 39 and 40.

Each of the electric valves 37 and 38 is provided with a pair of timing circuits one of which, 55, will hereinafter be referred to as the off timing circuit and the other of which, 56, will hereinafter be referred to as the on timing circuit. This designation is employed because the off timing circuits, when connected to the control elements of the electric valves, delay anode-cathode conduction therethrough for positive anode energization thereof and the on timing circuits maintain the electric valves conducting for a predetermined adjustable time with positive anode energization thereof.

These timing circuits are connected across direct current supply conductors 57 and 58 in accordance with the disclosure and claims of Patent 2,422,020, Robert E. Kingsmill, June 10, 1947. They are fed with direct current from a full wave rectifier comprising a double anode discharge device 59 and a mid-tapped secondary winding 60 of transformer 62. The output of this rectifier is filtered by a series resistor 61 and a parallel capacitor 62, and the voltage across conductors 57 and 58 is maintained uniform by a regulating valve 63 which has connected in series therewith across the output terminals of the rectifier, its usual voltage absorbing resistor 64. A voltage divider comprising series connected resistors 65 and 66 has its end terminals connected to conductors 57 and 58 and its mid-terminal connected to conductor 50 which, as previously stated, is connected to the cathodes of the electric valves 37 and 38. The heating filaments for the electric valves 37 and 38 and for the double anode discharge device 59 is supplied by a secondary winding 67 of transformer 62 through circuits the connections of which are obvious.

The off timing circuit for electric valve 37, which determines the squeeze time, comprises a capacitor 68 whose charging circuit is connected across the direct current conductors 57 and 58 through a fixed resistor 69 and the normally closed contacts 70 of relay 18. The discharge circuit for capacitor 68 is completed through a fixed resistor 71 and an adjustable resistor 72 connected across the terminals of capacitor 68 through the charging capacitor 69. The on timing circuit for electric valve 37, which determines the hold time, comprises a capacitor 73 whose charging circuit is connected across direct current conductors 57 and 58 through a fixed resistor 74 and an adjustable resistor 75. The discharge circuit for capacitor 73 is completed through the normally open contacts 76 of relay 18 and a fixed resistor 77 connected in series with one another across the terminals of capacitor 73.

The off timing circuit 55 for electric valve 38, which determines the off time, comprises a capacitor 78 whose charging circuit is connected across direct current conductors 57 and 58 through a fixed resistor 79, contacts 80 of a selector switch 81 and the normally open contacts 82 of relay 17. The discharge circuit for capacitor 78 is completed through a fixed resistor 83 and an adjustable resistor 84 connected in series with one another and with resistor 79 across its terminals. The on timing circuit 56 for electric valve 38, which determines the weld time, comprises a capacitor 85 whose charging circuit is connected across direct current conductors 57 and 58 through a fixed resistor 86 and an adjustable resistor 87. The discharge circuit for capacitor 85 is connected across its terminals through the normally closed contacts 88 of relay 17 and a fixed resistor 89.

Depending upon the pick-up and drop-out operation of relays 17 and 18 the control elements 46 of electric valves 37 and 38 are selectively connected to points in the pair of timing circuits of each of these electric valves at which transient changes in voltage occur upon the charging and discharging of the capacitors in these circuits. The control element 46 of electric valve 37 is connected through the usual current limiting resistor 90 and normally open contacts 91 of relay 18 to a point 92 in the off timing circuit 55 of electric valve 37 and through resistor 90 and normally closed contacts 93 of relay 18 to a point 94 in the on timing circuit 56 of electric valve 37. In like manner the control element 46 for electric valve 38 is connected through current limiting resistor 95 and normally closed contacts 96 of relay 17 to a point 97 in the off timing circuit 55 of electric valve 38 and through resistor 95 and normally open contacts 98 of relay 17 to a point 99 in the off timing circuit 56 of electric valve 38.

The system thus far described constitutes the invention of Maurice E. Bivens above referred to.

As will be pointed out subsequently, electric valves 37 and 38 will become conductive alternately and operate relays 17 and 18 alternately once the system has been set into operation by the closure of push button switch 49. It is desirable, however, to operate this system for just one sequence of timing operation and for this purpose a non-repeat initiating circuit is provided in accordance with my invention.

This non-repeat initiating circuit is connected to the control element 46 of electric valve 38 through selector switch 81 when this switch is thrown to its left-hand position to complete a circuit through its contacts 100. It will be noted that the pairs of contacts 80 and 100 of the selector switch 81 are so related to one another that only one pair of these contacts may be closed at a time. Thus, when the left-hand pair of contacts 100 are closed, the right-hand pair of contacts 80 are open, thereby opening the off time circuit 55 for electric valve 38.

The control element 46 of electric valve 38 is connected through contacts 100 of selector switch 81 and a resistor 101 to the more negative intermediate terminal 102 of a voltage divider comprising series connected resistors 103, 104, 105, whose end terminals are respectively connected to the direct current conductors 57 and 58. The more positive intermediate terminal 106 of this voltage divider is connected through the normally closed contacts 107 of relay 34 and conductor 113 to conductor 50 which is connected to the cathode of electric valve 38. Thus, the more negative intermediate terminal 102 of the voltage divider 103, 104, 105 impresses a voltage on the control element 46 of electric valve 38 which is negative relative to the voltage of its cathode 45.

A positive firing voltage is applied to the control element 46 of electric valve 38 by means of a capacitor 108, one terminal of which is directly connected to the control element 46 of electric valve 38 and through resistor 101 to the more negative intermediate terminal 102 of voltage divider 103, 104, 105. The other terminal of capacitor 108 is connected through a conductor 109 and a resistor 110 to direct current conductor 58 which is also the negative end terminal of the voltage divider 103, 104, 105. The common terminal between capacitor 108 and resistor 110 is connected to the alternating current supply conductor 39 and through contacts 51 of push button switch 49 to conductor 50. This conductor 50, as indicated in the drawing, is preferably connected to ground. A discharge resistor 111 is connected across the terminals of capacitor 108.

The features and advantages of my invention will be better understood from the following descriptions of the operation of the illustrated embodiment thereof.

The various elements of the system have been illustrated in their de-energized positions and it is with regard to this de-energized condition that the previously identified pairs of relay contacts have been referred to as normally open or normally closed.

Operation of the system is initiated by closing the push button switch 49 to complete a circuit through its contacts 51 which connects one of the alternating current supply conductors 39 to conductor 50 and thereby applies alternating current potential across the anode-cathode circuit of electric valve 38. The anode connection of this electric valve is completed through the operating winding 36 of relay 18 to the other alternating current supply conductor 40. With the selector switch 81 in the position illustrated, the control element 46 of electric valve 38 will be at the potential of direct current conductor 57 which is at an upper level relative to the direct current potential of conductor 50 which is connected to the cathode 45 of this electric valve. Consequently, immediately after closure of switch 49, the first positive half wave of anode potential applied to electric valve 38 will cause this electric valve to conduct and the current flow therethrough will cause relay 18 to pick up, closing its normally open contacts 52, 76 and 91 and opening its normally closed contacts 93 and 70.

The closure of contacts 52 of relay 18 connects alternating current supply conductor 40 through the operating winding 35 of relay 17 to the anode 44 of electric valve 37. This valve, however, will not conduct immediately due to the time delay imposed by the off timing circuit 55 of electric valve 37. Prior to pick-up operation of relay, capacitor 68 in its off timing circuit was charged by its connection through normally closed contacts 70 of relay 18 across direct current conductors 57 and 58. Not until a predetermined time has elapsed after the opening of contact 70 of relay 18 will the charge on capacitor 68 have discharged through its discharging circuit 67, 71 and 72 to a value at which the voltage at point 92 in the off timing circuit 55 becomes more positive than the voltage of the cathode 45 of this electric valve which is connected to direct current conductor 50 having an intermediate voltage level between that of the upper level of conductor 57 and the lower level of conductor 58. After this predetermined time interval has elapsed, which is the squeeze time of the welding sequence, electric valve 37 will become conductive, energizing the operating winding 35 of relay 17, causing this relay to pick up and close its normally open contacts 116, 98 and 82 and open its normally closed contacts 88 and 96. This opens the discharging circuit of capacitor 85 in the on timing circuit 56 of electric valve 38 and connects the control element 46 of electric valve 38 to point 99 in this timing circuit. Electric valve 38, consequently, continues to conduct for the time established by the on timing circuit 56 therefor, until the point 99 therein goes sufficiently negative to render electric valve 38 non-conducting. This period of time is the weld time of the welding sequence.

When electric valve 38 becomes non-conducting, relay 18 drops out, opening its contacts 52, 76 and 91 and closing its contacts 93 and 70. Electric valve 37 does not, however, become immediately non-conducting. It remains conducting until the capacitor 73 has sufficiently charged to lower the voltage at point 94 in its on timing circuit 56 to render it non-conducting. This time interval is the hold time of the welding sequence.

When the electric valve 37 becomes non-conducting, relay 17 drops out, opening its normally open contacts 116, 98 and 82 and closing its normally closed contacts 88 and 96. This opens the charging circuit of the capacitor 78 in the off timing circuit 55 at contacts 82 and transfers the control element connection to point 97 in this timing circuit. After a predetermined time interval, the charge on capacitor 78 decreases sufficiently so that the control element 46 becomes positive relative to its cathode when the electric valve 38 again becomes conducting. This period is the off time of the welding sequence.

It will be noted that, for the squeeze time, relay 18 is picked up, while relay 17 is dropped out; that, for the weld time, both of these relays are picked up; that, for the hold time, relay 17 is picked up, while relay 18 is dropped out; and that, for the off time, both of the relays have dropped out. Thus, for the welding sequence of four time intervals, each relay is picked up but once and dropped out but once, thereby reducing to a minimum the delays imposed in the timing sequence by reason of the pick-up and drop-out times of these relays.

When either or both of the relays 17 and 18 have picked up, the operating winding 112 of relay 34 remains energized by being connected across conductors 39 and 40 through these contacts and the holding contacts 115 of relay 34. Consequently, the solenoid valve 26 will be operated to apply welding pressure through the electrodes 19 and 20 to the work 21 inserted therebetween, due to the closure of normally open contacts 33 of relay 34 which are in the energizing circuit 32 for the operating winding 31 of the solenoid for this valve. When, however, both of the relays 17 and 18 have dropped down, relay 34 will be de-energized, opening its contacts 33 and thereby releasing the welding pressure.

When both the relays 17 and 18 have picked up, the series connected pairs of contacts 15 and 16 in the ignition circuit 14 for the electric valves 6 is completed, rendering these valves conducting to supply welding current to the electrodes 19 and 20 through the agency of welding transformer 5.

Once the sequence of operations above described have been initiated, they will continue until the system is de-energized.

In order to have the system operated in a non-repeat fashion in accordance with my invention, the selector switch 81 is thrown to its left-hand or non-repeat position which connects the control element 46 of electric valve 38 to its non-repeat excitation circuit. When thus connected, the negative bias of intermediate terminal 102 of voltage divider 103, 104, 105 is connected through resistor 101, contacts 100 of selector switch 81 and normally closed contacts 96 of relay 17 to control element 46 of electric valve 38. Then, upon the closure of push button switch 49, when the anode-cathode circuit of electric valve 38 is connected across the alternating current supply conductors 39 and 40, the lower terminal of capacitor 108 is switched from its connection through resistor 110 to direct current conductor 58 to a connection with the more positive direct current conductor 50. This produces a voltage change at this lower terminal of the capacitor which is in a positive direction and greater in magnitude than the bias voltage applied to the control element 46 of electric valve 38 by its connection with intermediate terminal 102 of the voltage divider 103, 104, 105. This voltage change is reflected on the upper plate of the capacitor 108 which is directly connected to control element 46 of electric valve 38, thereby rendering this electric valve conducting. This change in voltage is absorbed by the buffer resistor 101 which is connected between the control element 46 of electric valve 38 and intermediate terminal 102 of the voltage divider. After a predetermined time interval the change on capacitor 108 leaks off through the discharge resistor 111 connected across its terminals.

Thereafter, the sequence of operation for relays 18 and 17 is as previously described. When relay 18 picks up it energizes the operating winding 112 of relay 34 through its contacts 52 as previously described and relay 34 opens its normally closed contacts 107. This opens the tie between intermediate terminal 106 of voltage divider 103, 104, 105 and the direct current conductor 50 of intermediate voltage level. The values of resistors 103, 104, and 105 are such that the voltage of intermediate terminal 102 of the voltage divider thus becomes positive relative to direct current conductor 50, and once conducting, electric valve will remain conducting until the pick up of relay 17 opens its contacts 96. Its conduction will then continue for the weld period determined by the on circuit 56 to which its control element 46 is then connected through contacts 98 of relay 17.

When both of the relays 17 and 18 drop down at the end of the hold time, relay 34 drops down, again completing the connection of intermediate terminal 106 of voltage divider 103, 104, 105 to the direct current conductor 50 of intermediate voltage level, thereby making the intermediate terminal 102 of this voltage divider negative relative to conductor 50 to impress a negative bias voltage on the control element 46 of electric valve 38, biasing this electric valve off and terminating the welding sequence of squeeze, weld, and hold times. Another welding sequence may be initiated by opening and again closing push button switch 49.

It is, of course, apparent that my invention may be variously modified without departing from the spirit and scope of the teachings thereof. Therefore, while I have shown and described but one embodiment of my invention, it will be obvious to those skilled in the art that other embodiments thereof may be made without departing from my invention in its broadest aspects. I, therefore, aim in the appended claims to cover all such changes and modifications as fall within the true spirit and scope of my invention.

What I claim as new and desire to secure by Letters Patent of the United States is:

1. Apparatus comprising an electric valve having an anode, a cathode and a control element alternating current supply conductors respectively connected to the anode and cathode of said electric valve, a resistor having one terminal connected to the control element of said electric valve, a source of bias voltage having its negative terminal connected to the other terminal of said resistor and having its positive terminal connected to the cathode of said electric valve, a capacitor having one terminal directly connected to the control element of said electric valve and to the control element terminal of said resistor, means for impressing on the other terminal of said capacitor a voltage change which is in a positive direction and greater in magnitude than said bias voltage, and a discharge resistor permanently connected across the terminals of said capacitor.

2. Apparatus comprising an electric valve having an anode, a cathode and a control element, alternating current supply conductors respectively connected to the anode and cathode of said electric valve, three direct current terminals the second of which is more negative than the first and the third of which is more negative than the second, a connection between said first direct current terminal and the cathode of said electric valve, a capacitor having one terminal directly connected to the control element of said electric valve, a resistor connected between said control element connected terminal of said capacitor and said second direct current terminal, a second resistor connected between the other terminal of said capacitor and said third direct current terminal, a control switch having normally open contacts making a direct connection between said other terminal of said capacitor and said first direct current terminal, and a discharge resistor connected directly across the terminals of said capacitor.

3. Apparatus comprising an electric valve having an anode, a cathode and a control element, alternating current supply conductors respectively connected to the anode and cathode of said electric valve, a source of direct current voltage having first and second terminals whose voltages are respectively positive and negative relative to the voltage of a third terminal, a connection between the cathode of said electric valve and said first terminal of said source of direct current voltage, a capacitor having one terminal thereof directly connected to the control element of said electric valve, a resistor connected between the control element connected terminal of said capacitor and said third terminal of said source of direct current voltage, a second resistor connected between the other terminal of said capacitor and said second terminal of said source of direct current voltage, a control switch having normally open contacts connected between said other terminal of said capacitor and said first terminal of said source of direct current voltage, and a discharge resistor connected across the terminals of said capacitor.

4. Apparatus comprising an electric valve having an anode, a cathode and a control element, alternating current supply conductors one of which is connected to the anode of said electric valve, conductors supplying upper, lower and intermediate levels of direct current voltage, a connection between the cathode of said electric valve and said direct current conductor of intermediate voltage level, a voltage divider having end terminals connected across said direct current conductors of upper and lower voltage levels and having two intermediate terminals the more positive of which is normally connected to said direct current conductor of intermediate voltage level, a capacitor having one of its terminals directly connected to the control element of said electric valve, a resistor connected between said control element connected terminal of said capacitor and the more negative intermediate terminal of said voltage divider, a second resistor connected between the other terminal of said capacitor and said end terminal of said voltage divider which is connected to said direct current conductor of lower voltage level, a discharge resistor permanently connected across the terminals of said capacitor, normally nonconducting switching means connected between the cathode of said electric valve and the common terminals of said capacitor and said second resistor and between the cathode of said electric valve and the other of said alternating current supply conductors, means for rendering said switching means conducting, and means responsive to a predetermined change in the anode-cathode conductivity of said electric valve for opening the connection between said more positive intermediate terminal of said voltage divider and said direct current conductor of intermediate voltage and for completing a circuit about said switching means.

5. Apparatus comprising an electric valve having an anode, a cathode and a control element, alternating current supply conductors one of which is connected to the anode of said electric valve, conductors supplying upper, lower and intermediate levels of direct current voltage, a connection between the cathode of said electric valve and said direct current conductor of intermediate voltage level, a voltage divider having end terminals connected to said direct current conductors of upper and lower voltage levels and having two intermediate terminals the more positive of which is normally connected to said direct current conductor of intermediate voltage level, said elements of said voltage divider being proportioned relatively to one another to make said more negative intermediate terminal positive relative to said direct current conductor of intermediate voltage level when said more positive intermediate terminal of said voltage divider is disconnected from said direct current conductor of intermediate voltage level, a capacitor having one of its terminals directly connected to the control element of said electric valve, a resistor connected between said control element connected terminal of said capacitor and the more negative intermediate terminal of said voltage divider, a second resistor connected between the other terminal of said capacitor and said end terminal of said voltage divider which is connected to said direct current conductor of lower voltage level, a discharge resistor permanently connected across the terminals of said capacitor, normally nonconducting switching means connected between the cathode of said electric valve and the common terminals of said capacitor and said second resistor and between the cathode of said electric valve and the other of said alternating current supply conductors, means for rendering said switching means conducting, and means responsive to a predetermined change in the anode-cathode conductivity of said electric valve for opening the connection between said more positive intermediate terminal of said voltage divider and said direct current conductor of intermediate voltage and for completing a circuit about said switching means.

6. Apparatus comprising alternating current supply conductors, an electric valve having an anode, a cathode and a control element, direct current supply conductors, the more positive of which is connected to the cathode of said electric valve, a voltage divider having its end terminals respectively connected to said direct current supply conductors and having a terminal intermediate its end terminals, a relay having normally open contacts and having an operating winding connected in series relation with the anode-cathode circuit of said electric valve to one of said alternating current supply conductors, an initiating switch having normally open contacts connected between the other of said alternating current supply conductors and said cathode of said electric valve, a control circuit, a second relay having contacts connected in said control circuit, normally closed contacts connecting said voltage divider across said direct current supply conductors and normally open contacts connected across said contacts of said initiating switch, and having an operating winding connected across said alternating current supply conductors through the normally open contacts of said initiating switch and the normally open contacts of said first relay, two resistors, a capacitor having one of its terminals directly connected to the control element of said electric valve and through one of said resistors to said intermediate terminal of said voltage divider and having its other terminal directly connected to said other of said alternating current supply conductors and through the other of said resistors to the more negative of said direct current conductors, and a discharge resistor permanently connected across the terminals of said capacitor.

7. Apparatus comprising alternating current supply conductors, conductors supplying upper, lower and intermediate levels of direct current voltage, first and second electric valves each having an anode, a cathode and a control element and each having its cathode connected to said direct current conductor of intermediate voltage, first, second and third relays each having an operating winding and pairs of contacts, a voltage divider having end terminals respectively connected to said direct current conductors of upper and lower voltage levels and having two intermediate terminals the more positive of which is connected through a pair of normally closed contacts of said third relay to said direct current conductor of intermediate voltage level, a selector switch having two pairs of contacts only one pair of which may be closed at a time, a non-repeat excitation circuit for said first electric valve including a capacitor and three resistors, said capacitor having one terminal directly connected to the control element of said first electric valve through one pair of contacts of said selector switch and a normally closed pair of contacts of said second relay and through one of said resistors to the more negative of said intermediate terminals of said voltage divider, said capacitor having its other terminal connected to one terminal of another of said resistors whose other terminal is connected to said direct current conductor of lower voltage level and said capacitor having both of its terminals connected to the terminals of the third of said resistors which constitutes a discharge path therefor, an initiating switch having a pair of normally open contacts one of which is directly connected to said direct current conductor of intermediate voltage level and the other of which is directly connected to said other terminal of said capacitor and to one of said alternating current supply conductors, a holding circuit connected in series with the operating winding of said third relay and across the normally open contacts of said initiating switch through a pair of normally open contacts of said third relay, a circuit connecting the winding of said third relay in series relation with the normally open contacts of said initiating switch and parallel connected pairs of normally open contacts of said first and second relays across said alternating current supply conductors, a circuit connecting the winding of said first relay in series relation with the anode-cathode circuit of said first electric valve to the other of said alternating current supply conductors, a circuit connecting the winding of said second relay in series relation with the anode-cathode circuit of said second electric valve and a pair of normally open contacts of said first relay to the other of said alternating current supply conductors, off and on control element timing circuits for each of said electric valves, each of said off timing circuits having a capacitor, a discharge circuit permanently connected across said capacitor and a charging circuit for said capacitor connected across said direct current conductors of upper and lower voltage levels for said first electric valve through a pair of contacts of said selector switch and a normally open pair of contacts of said second relay and for said second electric valve through a normally closed pair of contacts of said first relay, each of said on timing circuits having a capacitor, a charging circuit for said capacitor permanently connected across said direct current conductors of upper and lower voltage levels and a discharge circuit connected for said first electric valve across said capacitor through a normally closed pair of contacts of said second relay and for said second electric valve through a normally open pair of contacts of said first relay, the control element of said first electric valve being connected to its said off timing circuit through said normally closed pair of contacts of said second relay which are also connected in said non-repeat excitation circuit and to its said on timing circuit through a normally open pair of contacts of said second relay, and the control element of said second electric valve being connected to its said off timing circuit through a normally open pair of contacts of said first relay and to its said on timing circuit through a pair of normally closed contacts of said first relay, said control element connections of each of said electric valves being to points in said timing circuits at which occur, upon charging and discharging of said capacitors, transient changes of voltage which with anode energization of said electric valves delays the attainment of pick-up and drop-out values of current flow through said relay windings and the anode-cathode circuits of said electric valves connected in series therewith, a control circuit having connected therein series connected pairs of contacts of said first and second relays, and a second control circuit having connected therein a pair of contacts of said third relay.

8. Apparatus comprising alternating current supply conductors, conductors supplying upper, lower and intermediate levels of direct current voltage, first and second electric valves each having an anode, a cathode and a control element and each having its cathode connected to said direct current conductor of intermediate voltage, first, second and third relays each having an operating winding and pairs of contacts, a voltage divider having end terminals respectively connected to said direct current conductors of upper and lower voltage levels and having two intermediate terminals the more positive of which is connected through a pair of normally closed contacts of said third relay to said direct current conductor of intermediate voltage level, a selector switch having two pairs of contacts only one pair of which may be closed at a time, a non-repeat excitation circuit for said first electric valve including a capacitor and three resistors, said capacitor having one terminal directly connected to the control element of said first electric valve through one pair of contacts of said selector switch and a normally closed pair of contacts of said second relay and through one of said resistors to the more negative of said intermediate terminals of said voltage divider, said capacitor having its other terminal connected to one terminal of another of said resistors whose other terminal is connected to said direct current conductor of lower voltage level and said capacitor having both of its terminals connected to the terminals of the third of said resistors which constitutes a discharge path therefor, an initiating switch having a pair of normally open contacts one of which is directly connected to said direct current conductor of intermediate voltage level and the other of which is directly connected to said other terminal of said capacitor and to one of said alternating current supply conductors, a holding circuit connected in series with the operating winding of said third relay and across the normally open contacts of said initiating switch through a pair of normally open contacts of said third relay, a circuit connecting the winding of said third relay in series relation with the normally open contacts of said initiating switch and parallel connected pairs of normally open contacts of said first and second relays across said alternating current supply conductors, a circuit connecting the winding of said first relay in series relation with the anode-cathode circuit of said first electric valve to the other of said alternating current supply conductors, a circuit connecting the winding of said second relay in series relation with the anode-cathode circuit of said second electric valve and a pair of normally open contacts of said first relay to the other of said alternating current supply conductors, off and on control element timing circuits for each of said electric valves, each of said off timing circuits having a capacitor, a discharge circuit permanently connected across said capacitor and a charging circuit for said capacitor connected across said direct current conductors of upper and lower voltage levels for said first electric valve through a pair of contacts of said selector switch and a normally open pair of contacts of said second relay and for said second electric valve through a normally closed pair of contacts of said first relay, each of said on timing circuits having a capacitor, a charging circuit for said capacitor permanently connected across said direct current conductors of upper and lower voltage levels and a discharge circuit connected for said first electric valve across said capacitor through a normally closed pair of contacts of said second relay and for said second electric valve through a normally open pair of contacts of said first relay, the control element of said first electric valve being connected to its said off timing circuit through said normally closed pair of contacts of said second relay which are also connected in said non-repeat excitation circuit and to its said on timing circuit through a normally open pair of contacts of said second relay, and the control element of said second electric valve being connected to its said off timing circuit through a normally open pair of contacts of said first relay and to its said on timing circuit through a pair of normally closed contacts of said first relay, said control element connections of each of said electric valves being to points in said timing circuits at which occur, upon charging and discharging of said capacitors, transient changes of voltage which with anode energization of said electric valves delays the attainment of pick-up and drop-out values of current flow through said relay windings and the anode-cathode circuits of said electric valves connected in series therewith, and translating apparatus having two control circuits the opening and closing of which in sequence controls the operation of said translating apparatus, one of said control circuits having connected therein series connected pairs of contacts of said first and second relays and the other of said control circuits having connected therein a pair of contacts of said third relay.

9. Apparatus comprising alternating current supply conductors, conductors supplying upper, lower and intermediate levels of direct current voltage, first and second electric valves each having an anode, a cathode and a control element and each having its cathode connected to said direct current conductor of intermediate voltage, first, second and third relays each having an operating winding and pairs of contacts, a voltage divider having end terminals respectively connected to said direct current conductors of upper and lower voltage levels and having two intermediate terminals the more positive of which is connected through a pair of normally closed contacts of said third relay to said direct current conductor of intermediate voltage level, a non-repeat excitation circuit for said first electric valve including a capacitor and three resistors, said capacitor having one terminal directly connected to the control element of said first electric valve through a normally closed pair of contacts of said second relay and through one of said resistors to the more negative of said intermediate terminals of said voltage divider, said capacitor having its other terminal connected to one terminal of another of said resistors whose other terminal is connected to said direct current conductor of lower voltage level and said capacitor having both of its terminals connected to the terminals of the third of said resistors which constitutes a discharge path therefor, an initiating switch having a pair of normally open contacts one of which is directly connected to said direct current conductor of intermediate voltage level and the other of which is directly connected to said other terminal of said capacitor and to one of said alternating current supply conductors, a holding circuit connected in series with the operating winding of said third relay and across the normally open contacts of said initiating switch through a pair of normally open contacts of said third relay, a circuit connecting the winding of said third relay in series relation with the normally open contacts of said initiating switch and parallel connected pairs of normally open contacts of said first and second relays across said alternating current supply conductors, a circuit connecting the winding of said first relay in series relation with the anode-cathode circuit of said first electric valve to the other of said alternating current supply conductors, a circuit connecting the winding of said second relay in series relation with the anode-cathode circuit of said second electric valve and a pair of normally open contacts of said first relay to the other of said alternating current supply conductors, an off control element timing circuit for said second electric valve, said timing circuit having a capacitor, a discharge circuit permanently connected across said capacitor and a charging circuit for said capacitor connected across said direct current conductors of upper and lower voltage levels through a normally closed pair of contacts of said first relay, an on control element timing circuit for each of said electric valves, each of said on timing circuits having a capacitor, a charging circuit for said capacitor permanently connected across said direct current conductors of upper and lower voltage levels and a discharge circuit connected for said first electric valve across said capacitor through a normally closed pair of contacts of said second relay and for said second electric valve through a normally open pair of contacts of said first relay, the control element of said first electric valve being connected to its said on timing circuit through a normally open pair of contacts of said first relay and to its said on timing circuit through a pair of normally closed contacts of said first relay, said control element connections of each of said electric valves being to points in said timing circuits at which occur, upon charging and discharging of said capacitors, transient changes of voltage which with anode energization of said electric valves delays the attainment of pick-up and drop-out values of current flow through said relay windings and the anode-cathode circuits of said electric valves connected in series therewith, a control circuit having connected therein series connected pairs of contacts of said first and second relays, and a second control circuit having connected therein a pair of contacts of said third relay.

10. Apparatus comprising alternating current supply conductors, conductors supplying upper, lower and intermediate levels of direct current voltage, first and second electric valves each having an anode, a cathode and a control element and each having its cathode connected to said direct current conductor of intermediate voltage, first, second and third relays each having an operating winding and pairs of contacts, a voltage divider having end terminals respectively connected to said direct current conductors of upper and lower voltage levels and having two intermediate terminals the more positive of which is connected through a pair of normally closed contacts of said third relay to said direct current conductor of intermediate voltage level, a non-repeat excitation circuit for said first electric valve including a capacitor and three resistors, said capacitor having one terminal directly connected to the control element of said first electric valve through a normally closed pair of contacts of said second relay and through one of said resistors to the more negative of said intermediate terminals of said voltage divider, said capacitor having its other terminal connected to one terminal of another of said resistors whose other terminal is connected to said direct current conductor of lower voltage level and said capacitor having both of its terminals connected to the terminals of the third of said resistors which constitutes a discharge path therefor, an initiating switch having a pair of normally open contacts one of which is directly connected to said direct current conductor of intermediate voltage level and the other of which is directly connected to said other terminal of said capacitor and to one of said alternating current supply conductors, a holding circuit connected in series with the operating winding of said third relay and across the normally open contacts of said initiating switch through a pair of normally open contacts of said third relay, a circuit connecting the winding of said third relay in series relation with the normally open contacts of said initiating switch and parallel connected pairs of normally open contacts of said first and second relays across said alternating current supply conductors, a circuit connecting the winding of said first relay in series relation with the anode-cathode circuit of said first electric valve to the other of said alternating current supply conductors, a circuit connecting the winding of said second relay in series relation with the anode-cathode circuit of said second electric valve and a pair of normally open contacts of said first relay to the other of said alternating current supply conductors, an off control element timing circuit for said second electric valve, said timing circuit having a capacitor, a discharge circuit permanently connected across said capacitor and a charging circuit for said capacitor connected across said direct current conductors of upper and lower voltage levels through a normally closed pair of contacts of said first relay, an on control element timing circuit for each of said electric valves, each of said on timing circuits having a capacitor, a charging circuit for said capacitor permanently connected across said direct current conductors of upper and lower voltage levels and a discharge circuit connected for said first electric valve across said capacitor through a normally closed pair of contacts of said second relay and for said second electric valve through a normally open pair of contacts of said first relay, the control element of said first electric valve being connected to its said on timing circuit through a normally open pair of contacts of said first relay and to its said on timing circuit through a pair of normally closed contacts of said first relay, said control element connections of each of said electric valves being to points in said timing circuits at which occur, upon charging and discharging of said capacitors, transient changes of voltage which with anode energization of said electric valves delays the attainment of pick-up and drop-out values of current flow through said relay windings and the anode-cathode circuits of said electric valves connected in series therewith, and translating apparatus having two control circuits the opening and closing of which in sequence controls the operation of said translating apparatus, one of said control circuits having connected therein series connected pairs of contacts of said first and second relays and the other of said control circuits having connected therein a pair of contacts of said third relay.

WILLIAM B. HILLS.

No references cited.